United States Patent
Bedeschi

(10) Patent No.: US 11,203,226 B2
(45) Date of Patent: Dec. 21, 2021

(54) WHEEL FOR SUPPORTING TIRES FOR VEHICLES

(71) Applicant: RI-BA COMPOSITES S.R.L., Faenza (IT)

(72) Inventor: Andrea Bedeschi, Faenza (IT)

(73) Assignee: BUCCI COMPOSITES S.P.A., Faenza (IT)

( * ) Notice: Subject to any disclaimer, the term of this patent is extended or adjusted under 35 U.S.C. 154(b) by 232 days.

(21) Appl. No.: 16/481,700

(22) PCT Filed: Jan. 29, 2018

(86) PCT No.: PCT/EP2018/052100
§ 371 (c)(1),
(2) Date: Jul. 29, 2019

(87) PCT Pub. No.: WO2018/141679
PCT Pub. Date: Aug. 9, 2018

(65) Prior Publication Data
US 2019/0389245 A1    Dec. 26, 2019

(30) Foreign Application Priority Data
Jan. 31, 2017    (IT) .................... 102017000009997

(51) Int. Cl.
*B60B 3/10* (2006.01)
*B60B 3/12* (2006.01)
(Continued)

(52) U.S. Cl.
CPC .................. *B60B 3/10* (2013.01); *B60B 3/12* (2013.01); *B60B 3/16* (2013.01); *B60B 5/02* (2013.01);
(Continued)

(58) Field of Classification Search
CPC .... B60B 3/10; B60B 3/12; B60B 3/16; B60B 3/08; B60B 3/008; B60B 2360/104;
(Continued)

(56) References Cited

U.S. PATENT DOCUMENTS 3,669,501 A * 6/1972 Derleth ..................... B60B 5/02
301/37.42
3,826,538 A * 7/1974 Lipper .................... B60B 25/22
301/64.306
(Continued)

FOREIGN PATENT DOCUMENTS

| DE | 102012107692 A1 * | 2/2014 | ............... B60B 3/10 |
| DE | 102015006652 A1 * | 4/2016 | ............... B60B 3/12 |
| WO | 2013083729 A2 | 6/2013 | |

OTHER PUBLICATIONS

International Search Report dated May 7, 2018 re: Application No. PCT/EP2018/052100, pp. 1-3, citing: US 2016/0288563 A1, WO 2013/083729 A2, US 2015/0360509 A1 and US 2015/0210862 A1.
(Continued)

*Primary Examiner* — Kip T Kotter
(74) *Attorney, Agent, or Firm* — Cantor Colburn LLP

(57) ABSTRACT

A wheel for supporting tires for vehicles which is made of composite material based on carbon fiber, which includes an insert which is made of metallic material at its central region configured to be fixed to the hub of the respective vehicle. The insert is coupled between external contoured laminated shells made of composite material, with the interposition of at least one interface film having a thickness that can vary between 0.05 mm and 1.0 mm.

The interface film is made of a material preferably chosen from among epoxy polymers, polyurethane polymers, acrylic polymers, silicone polymers, polyamide polymers, glass fibers, and combinations thereof.

6 Claims, 3 Drawing Sheets

(51) Int. Cl.
  *B60B 3/16* (2006.01)
  *B60B 5/02* (2006.01)
(52) U.S. Cl.
  CPC . *B60B 2360/104* (2013.01); *B60B 2360/3416* (2013.01); *B60B 2900/572* (2013.01)
(58) Field of Classification Search
  CPC .... B60B 2360/3412; B60B 2360/3416; B60B 2900/572
  See application file for complete search history.

(56) References Cited

U.S. PATENT DOCUMENTS

| | | | | |
|---|---|---|---|---|
| 3,909,065 | A * | 9/1975 | Main | B60B 3/08 301/64.306 |
| 6,340,210 | B1 * | 1/2002 | Handa | B60B 3/002 301/64.303 |
| 2013/0009453 | A1 * | 1/2013 | Martin | B60B 21/062 301/66 |
| 2015/0210862 | A1 | 7/2015 | Matsuda et al. | |
| 2015/0360509 | A1 | 12/2015 | Werner et al. | |
| 2016/0288563 | A1 | 10/2016 | Fukudome | |
| 2018/0170096 | A1 * | 6/2018 | Chenault, III | B60B 21/06 |
| 2019/0299703 | A1 * | 10/2019 | Taylor | B60B 3/08 |

OTHER PUBLICATIONS

IT Search Report dated Sep. 22, 2017 re: Application No. IT 2017000009997, pp. 1-7, citing: US 2016/0288563 A1, WO 2013/083729 A2, US 2015/0360509 A1 and US 2015/0210862 A1.
Written Opinion dated May 7, 2018 re: Application No. PCT/EP2018/052100, pp. 1-5, citing: US 2016/0288563 A1, WO 2013/083729 A2, US 2015/0360509 A1 and US 2015/0210862 A1.

* cited by examiner

WHEEL FOR SUPPORTING TIRES FOR VEHICLES

TECHNICAL FIELD

The present disclosure relates to a wheel for supporting tires for vehicles.

BACKGROUND

Some types of vehicles, in particular automobiles, ensure considerable performance levels in terms of speed and acceleration.

Obviously, for the same power of the engine, it is possible to obtain superior performance levels with vehicles of low mass, since they can be accelerated (or decelerated) more easily (they have lower inertia).

For this reason the use is known of wheels, on which the tires are installed, which are made of light alloys (in particular aluminum alloys and magnesium alloys) and/or composite materials based on carbon fiber, which offer excellent mechanical properties and an extremely low weight.

In wheels made of light alloys, the connection to the hub of the installation vehicle is simple and does not introduce any critical point that could cause fractures or degradation of the wheel: a central surface of the wheel, provided with holes for accommodating respective bolts, is juxtaposed to the hub and held to it following tightening of the bolts.

When adopting wheels made of composite material, it is not possible to reproduce an identical structure, since the mechanical load would be localized at the bolts, with consequent risk of localized fracture of the composite at the areas where these bolts are tightened.

In order to overcome such drawback, the use is known of clamping disks, between which to immobilize the wheel by compressing it in the step of tightening the bolts on the hub: such implementation solution makes it possible to execute an effective locking in place of the wheel, but it implies a mandatory shape for it (the central area must be flat in order to be capable of being clamped between the disks) and it increases the number of interface surfaces between the hub of the vehicle and the wheel.

The first problem is substantially aesthetic in nature, but is very relevant in that in the automotive sector every auto maker has its own style which must necessarily be maintained and therefore it is not possible for all makers to adopt wheels with a flat central surface clamped between respective tightening discs.

The second problem on the other hand is technical in nature: increasing the number of interface surfaces increases the probability of the presence of mechanical plays that, with the passing of time, could compromise the stability and safety of the vehicle.

Furthermore, it should be noted that such possible mechanical plays can be amplified under severe operating conditions: in particular, following numerous operations to brake the vehicle, the disk of the brake will be subjected to exceptionally intense heating which will be transmitted to the wheel; under conditions of intense heating, the hub, the tightening discs and the central part of the wheel made of carbon will be subjected to different thermal expansions owing to the fact that they are made of mutually different materials.

SUMMARY

The aim of the present disclosure is to solve the above mentioned drawbacks, by providing a wheel for supporting tires for vehicles which is made of composite material with any appearance and shape structure, in compliance with the style requirements imposed by the design of the vehicles that will be fitted with that wheel.

Within this aim, the disclosure provides a wheel for supporting tires for vehicles which is made of composite material that can be coupled directly to the hub of the installation vehicle.

The disclosure provides a wheel for supporting tires for vehicles which is made of composite material which is safe and mechanically stable even under conditions of high temperature.

The present disclosure further provides a wheel for supporting tires for vehicles which is low cost, easily and practically implemented, and safe in use.

This aim and these and other advantages which will become better apparent hereinafter are achieved by providing a wheel for supporting tires for vehicles which is made of composite material based on carbon fiber, characterized in that it comprises an insert which is made of metallic material at its central region designed to be fixed to the hub of the respective vehicle, said insert being coupled between external contoured laminated shells made of composite material, with the interposition of at least one interface film having a thickness that can vary between 0.05 mm and 1.0 mm, said interface film being made of a material preferably chosen from among epoxy polymers, polyurethane polymers, acrylic polymers, silicone polymers, polyamide polymers, glass fibers and combinations thereof.

BRIEF DESCRIPTION OF THE DRAWINGS

Further characteristics and advantages of the disclosure will become better apparent from the detailed description that follows of a preferred, but not exclusive, embodiment of the wheel for supporting tires for vehicles according to the disclosure, which is illustrated by way of non-limiting example in the accompanying drawings, wherein.

DETAILED DESCRIPTION OF THE DRAWINGS

Figure 1:
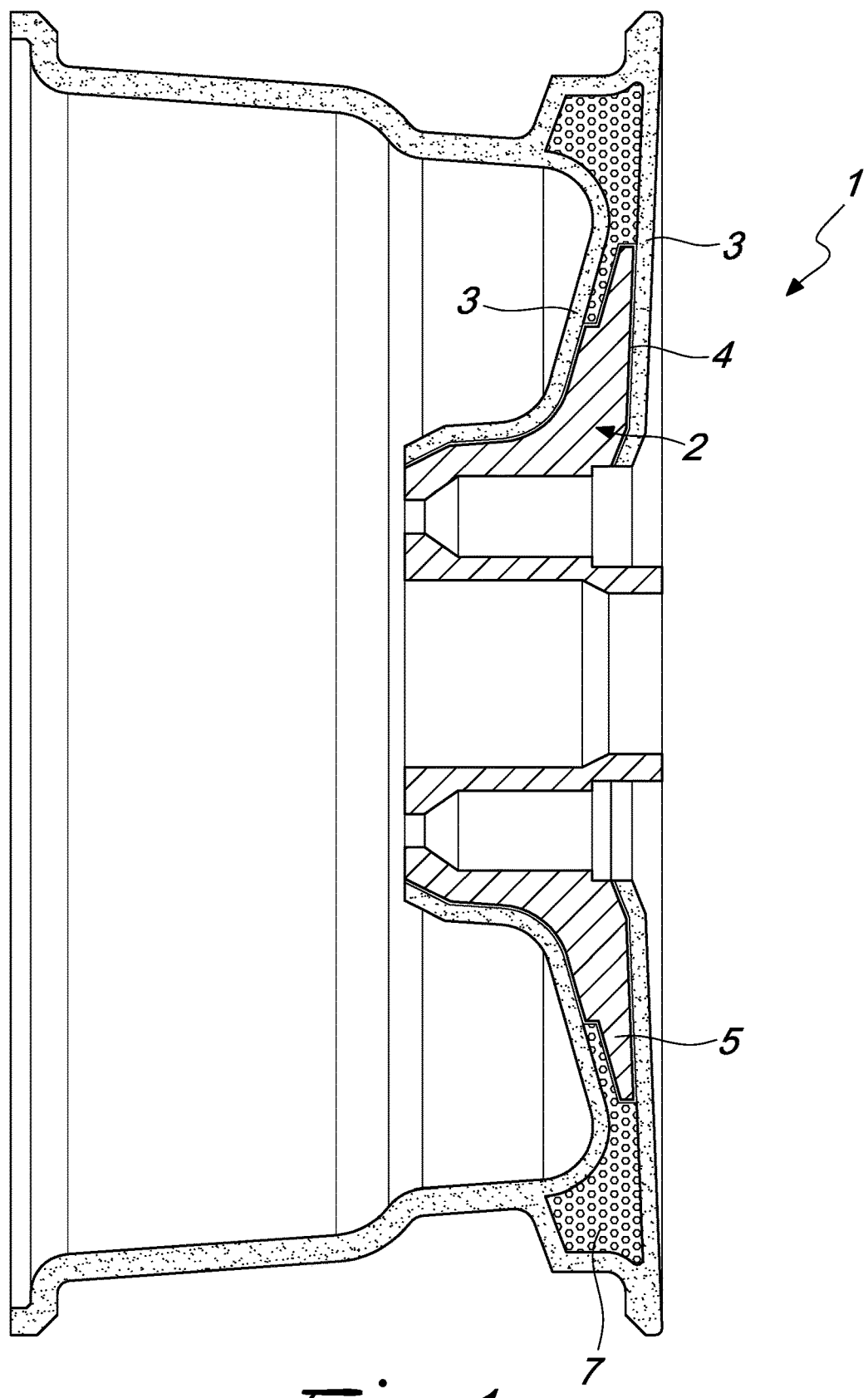
FIG. 1 is a cross-sectional view of a wheel for supporting tires for vehicles according to the disclosure.
Figure 2:
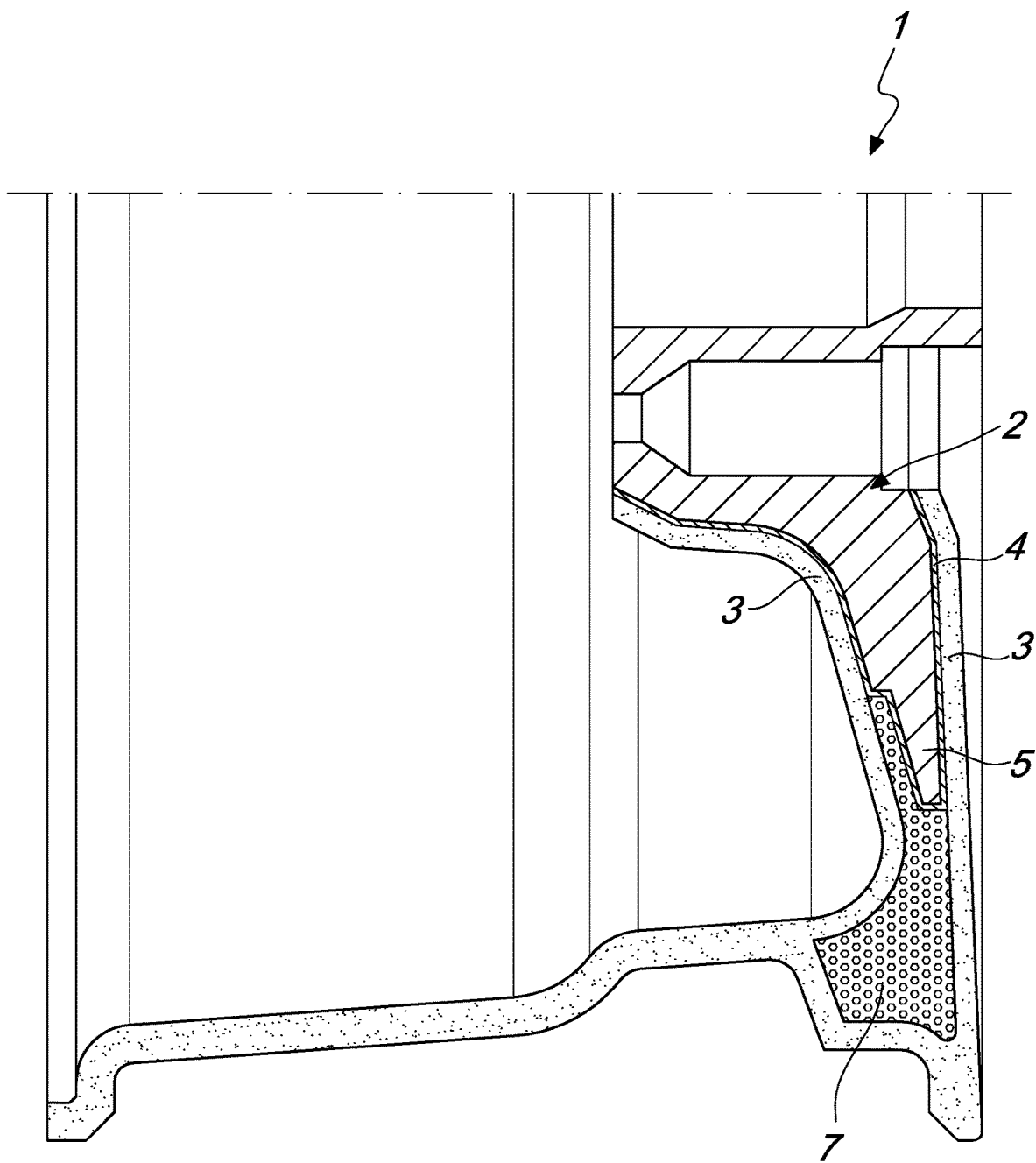
FIG. 2 is an enlarged view of FIG. 1.
Figure 3:
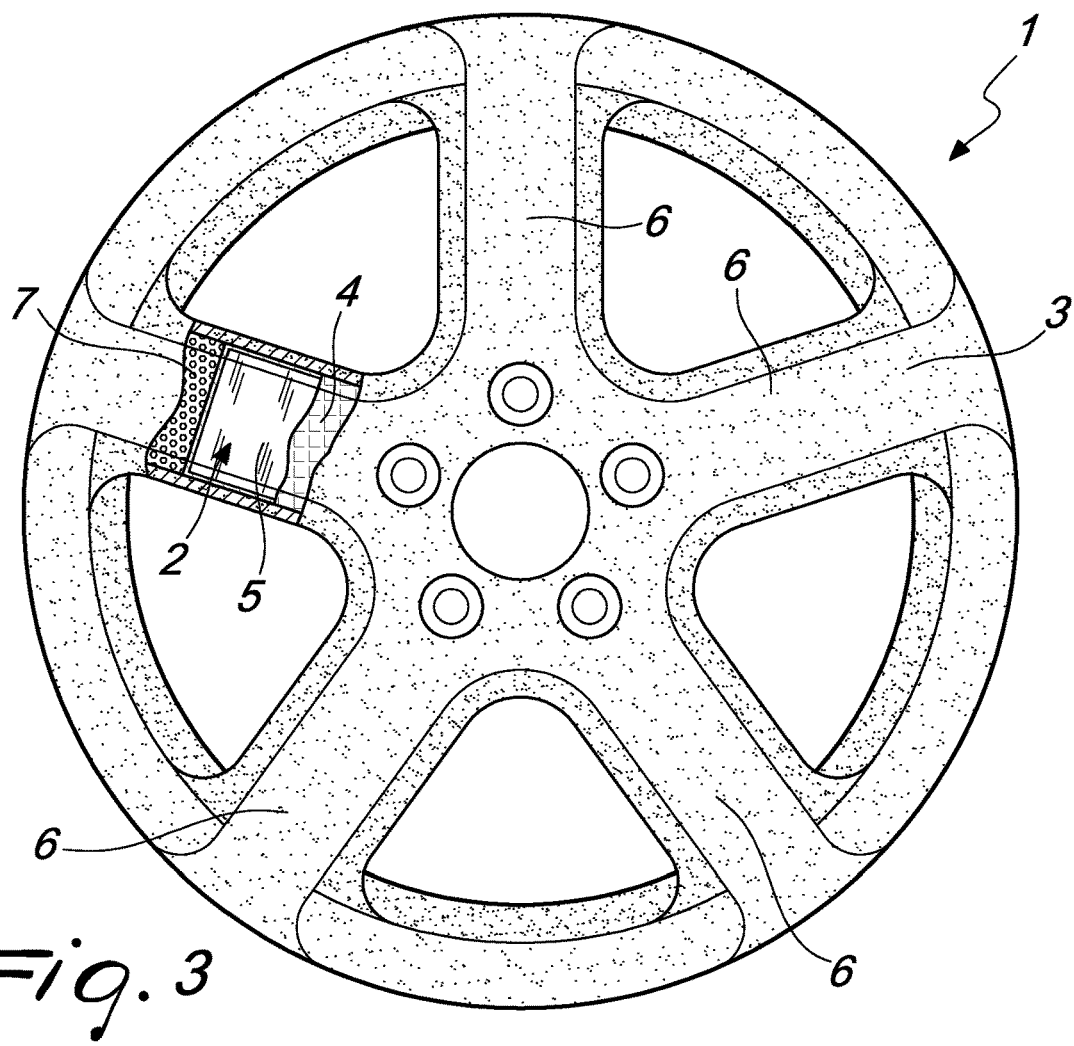
FIG. 3 is a partially cross-sectional front elevation view of a wheel according to the disclosure.
Figure 4:
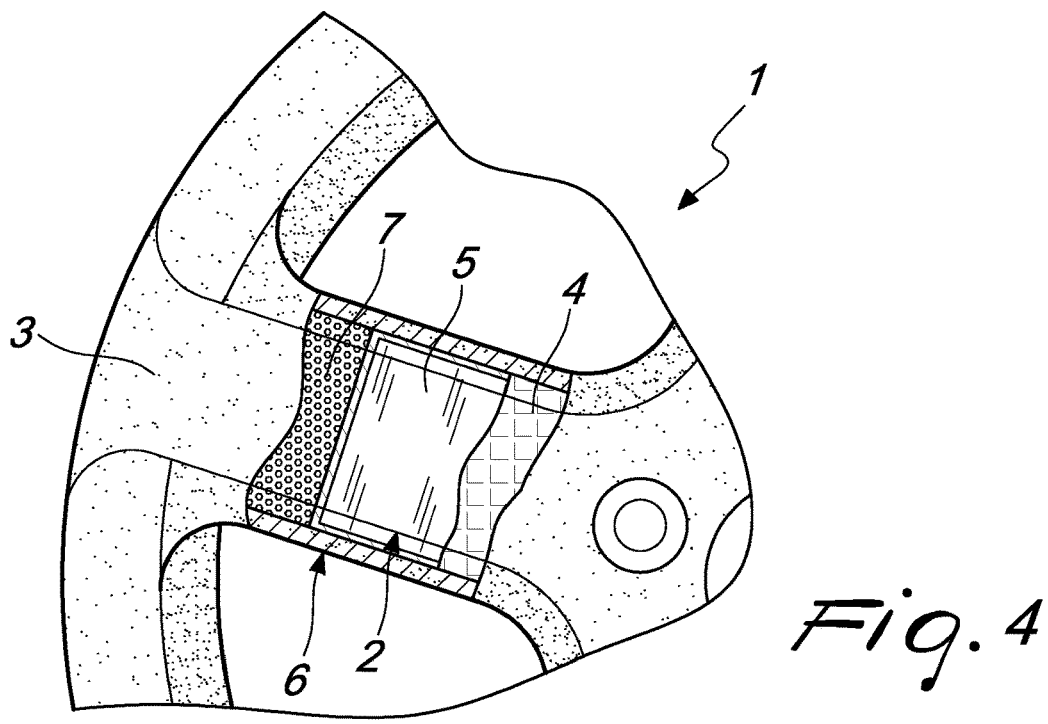
FIG. 4 is an enlarged view of FIG. 3.

With particular reference to FIGS. 1-4, the reference numeral 1 generally designates a wheel for supporting tires for vehicles.

The wheel 1 according to the disclosure is made of composite material based on carbon fiber: in essence it will therefore be constituted by structural carbon fibers (arranged in such a manner as to respond optimally to the stresses that are generated during the motion of the installation vehicle) that are stably coupled to a resin matrix.

The wheel 1 comprises an insert 2 which is made of metallic material arranged at its central region, which is designed to be fixed to the hub of the respective vehicle.

The insert 2 is coupled between external contoured laminated shells 3 made of composite material. The term "laminated shells" 3 is used to encompass all the possible embodiments of composite laminates of any shape (including spherical, cylindrical and fanciful).

Positively, at least one interface film 4 having a thickness that can vary between 0.05 mm and 1.0 mm is interposed between the insert 2 and the laminated shells 3.

The ideal thicknesses of the film 4 are those comprised between 0.2 mm and 0.8 mm, in relation to the majority of the possible applications on wheels 1 according to the disclosure.

The interface film 4 will be made of a material preferably chosen from among epoxy polymers, polyurethane polymers, acrylic polymers, silicone polymers, polyamide polymers, glass fibers and combinations thereof.

With particular reference to an embodiment of undoubted practical and applicative interest, the insert 2 can advantageously be made of high mechanical strength aluminum alloy.

In particular, preferably aluminum alloys will be used that are chosen preferably from among, according to the ASTM standard, those belonging to the 2000 group (Al/copper alloys) called Avional, to the 3000 group (Al/manganese alloys), to the 4000 group (Al/silicon alloys), to the 5000 group (Al/magnesium alloys), called Peraluman, to the 6000 group (Al/silicon and magnesium alloys), called Anticorodal, to the 7000 group (Al/zinc and magnesium alloys), to the 8000 group (mixed alloys) and to the 9000 group (Experimental series).

However, the possibility is not ruled out of using other metallic materials (in particular alloys constituted by different metals) for providing the insert 2.

It should be noted that the insert 2 comprises at least one substantially radial tab 5 which is at least partially tapered.

Such tab 5 will be accommodated within a respective spoke 6.

The wheel 1 according to the disclosure, in a specific embodiment thereof of excellent functionality and safety, can positively comprise, within each spoke 6, a body 7 made of highly deformable polymeric material, at its peripheral region, and it comprises the substantially radial tab 5 of the insert 2 at its central region.

The terminal end of the tab 5 of the insert 2 is aligned with and proximate to the end that lies closest to the center of the body 7 made of highly deformable polymeric material.

More simply, the terminal end of the tab 5 faces and is proximate to the most central portion of the body 7.

Any thermal expansions of the insert 2 (since it is made of metallic material it can undergo considerable size variations owing to its variations of temperature) will imply a lengthening of the radial tabs 5 with consequent compression of the body 7, without generating any damage to the laminated shells 3 made of composite material.

It should furthermore be noted that the interface film 4, above a predefined threshold temperature, will advantageously soften (with consequent modification of the mechanical behavior which may become, for example, viscous and/or elastomeric and/or exhibiting rubber-like elastic deformations, such as to allow the recovery of the original dimensions once the temperature is reduced), responding to stresses with rubber-like elastic deformations.

In particular the predefined threshold temperature is the glass transition temperature Tg' of the polymer that constitutes the film 4 proper.

The glass transition temperature Tg' is lower than the glass transition temperature Tg" of the polymeric matrix of the composite based on carbon fiber that constitutes the wheel 1 (in particular which constitutes the laminated shells 3).

It should furthermore be noted that the interface film 4 covers the insert 2 completely, also defining a protective layer against oxidative, galvanic and chemical corrosion.

In practice, upon variations of temperature of the wheel 1, the insert 2 and the laminated shells 3 will undergo size variations (proportional to a respective thermal expansion coefficient).

The thermal expansion coefficient of the metallic insert 2 will certainly be much higher than the coefficient of the composite laminated shells 3.

For this reason the presence of the film 4 constitutes an advantage in that it creates an expansion joint that allows a sliding between the insert 2 and the laminated shells 3, without the insert 2 damaging the laminated shells 3 by lengthening.

The protection conferred by the film 4 on the insert 2 also constitutes a solid screen against corrosion: in particular, aluminum and the composite based on carbon fiber have very different electronegativity values and therefore the interface surface could be affected by galvanic corrosion if the film 4 were not present.

Advantageously, the present disclosure solves the problems shown above, by providing a wheel 1 for supporting tires for vehicles which is made of composite material with any appearance and shape structure, in compliance with the style requirements imposed by the design of the vehicles that will be fitted with that wheel 1.

Conveniently the wheel 1 can be directly coupled to the hub of the installation vehicle, without the need to interpose dedicated tightening plates.

Positively the wheel 1 according to the disclosure is safe and mechanically stable even under conditions of high temperature.

Positively the wheel 1 made of composite material, for supporting tires for vehicles, is easily and practically implemented and is low cost: such characteristics make it an innovation that is certain to be safe in use.

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. 102017000009997 (UA2017A000562) from which this application claims priority are incorporated herein by reference.

The invention claimed is:

1. A wheel for supporting tires for vehicles which is made of composite material based on carbon fiber, the wheel comprises: an insert made of metallic material at a central region configured to be fixed to a hub of the vehicle, said insert being coupled between external contoured laminated shells made of composite material, with the interposition of at least one interface film having a thickness configured to vary between 0.05 mm and 1.0 mm, said interface film being made of a material chosen from among epoxy polymers, polyurethane polymers, acrylic polymers, silicone polymers, polyamide polymers, glass fibers, and combinations thereof, wherein said interface film covers said insert completely, defining a protective layer against oxidative, galvanic, and chemical corrosion.

2. The wheel according to claim 1, wherein said insert is made of aluminum alloy with high mechanical strength.

3. The wheel according to claim 2, wherein said insert comprises at least one substantially radial tab which is at least partially tapered, said tab being accommodated within a respective spoke.

4. The wheel according to claim 3, further comprising, within each spoke, a body made of highly deformable polymeric material at a peripheral region of each spoke and said substantially radial tab of said insert at a central region of each spoke, the terminal end of said tab of said insert being aligned with and proximate to the center of said body made of highly deformable polymeric material.

5. The wheel according to claim 1, wherein said interface film, above a predefined threshold temperature, softens, responding to stresses with elastic deformations.

6. The wheel according to claim 5, wherein said predefined threshold temperature is the glass transition temperature $Tg'$ of the polymer that constitutes said interface film, said glass transition temperature $Tg'$ being lower than the glass transition temperature $Tg''$ of the polymeric matrix of the composite based on carbon fiber that constitutes said wheel.

\* \* \* \* \*